US009129322B2

(12) United States Patent
Rausch et al.

(10) Patent No.: US 9,129,322 B2
(45) Date of Patent: Sep. 8, 2015

(54) ELECTRONIC BOOK RENTALS

(75) Inventors: Daniel B. Rausch, Seattle, WA (US);
Mohamed Aakhil Fardeen, Seattle, WA (US); David A. Limp, Medina, WA (US)

(73) Assignee: Amazon Technologies, Inc., Reno, NV (US)

( * ) Notice: Subject to any disclaimer, the term of this patent is extended or adjusted under 35 U.S.C. 154(b) by 9 days.

(21) Appl. No.: 12/981,056

(22) Filed: Dec. 29, 2010

(65) Prior Publication Data
US 2012/0173353 A1 Jul. 5, 2012

(51) Int. Cl.
G06Q 99/00 (2006.01)
G06Q 30/06 (2012.01)
G06Q 30/00 (2012.01)

(52) U.S. Cl.
CPC ........ *G06Q 30/0601* (2013.01); *G06Q 30/0645* (2013.01); *G06Q 30/00* (2013.01)

(58) Field of Classification Search
CPC ........................... G06Q 30/0645; G06Q 30/00
USPC ........................................ 705/26.1, 50, 51, 59
See application file for complete search history.

(56) References Cited

U.S. PATENT DOCUMENTS

| 5,892,900 | A * | 4/1999 | Ginter et al. ............. 726/26 |
| 7,426,494 | B2 * | 9/2008 | Ohmori et al. ............ 705/51 |
| 2004/0177369 | A1 * | 9/2004 | Akins, III ................ 725/31 |
| 2005/0119975 | A1 * | 6/2005 | O'Donnell ................ 705/51 |
| 2005/0144641 | A1 * | 6/2005 | Lewis ..................... 725/60 |
| 2005/0204405 | A1 * | 9/2005 | Wormington et al. ..... 726/27 |
| 2006/0218651 | A1 * | 9/2006 | Ginter et al. ............. 726/27 |
| 2007/0174888 | A1 * | 7/2007 | Rubinstein ............... 725/115 |
| 2007/0255580 | A1 * | 11/2007 | Cole et al. ............... 705/1 |
| 2008/0250080 | A1 * | 10/2008 | Arrasvuori et al. ....... 707/203 |
| 2009/0228396 | A1 * | 9/2009 | Miller .................... 705/59 |
| 2013/0132232 | A1 * | 5/2013 | Pestoni et al. ........... 705/26.25 |

FOREIGN PATENT DOCUMENTS

| JP | 2002140637 | 5/2002 |
| JP | 2002189867 | 7/2002 |
| JP | 2003085462 | 3/2003 |
| JP | 2003288538 | 10/2003 |
| JP | 2004013721 | 1/2004 |

(Continued)

OTHER PUBLICATIONS

The PCT Search Report mailed Apr. 24, 2012 for PCT Application No. PCT/US11/66142, 9 pages.

(Continued)

*Primary Examiner* — James D Nigh
(74) *Attorney, Agent, or Firm* — Lee & Hayes, PLLC

(57) ABSTRACT

Architectures and techniques are described to rent electronic books. In particular, a content provider can rent electronic books to individuals for a specified rental term. The individuals may have the option to modify the rental term for an electronic book. The rental term for a particular electronic book may be modified by extending the rental term of the particular electronic book or decreasing the rental term of the particular electronic book. Individuals may also convert the rental of an electronic book to a purchase and a purchase of an electronic book to a rental. In order to rent the electronic books to individuals, the content provider may acquire permission from the publishers of the electronic books. In some cases, the content provider may acquire a pool of time-bound rentable licenses from the publishers to allocate to individuals renting electronic books from the content provider.

29 Claims, 10 Drawing Sheets

(56) References Cited

FOREIGN PATENT DOCUMENTS

| JP | 2004287514 | 10/2004 |
|----|------------|---------|
| JP | 2006523423 | 10/2006 |

OTHER PUBLICATIONS

Translated the Japanese Office Action mailed Jul. 1, 2014 for Japanese patent application No. 2013-547543, a counterpart foreign application of U.S. Appl. No. 12/981,056, 8 pages.

The Extended European Search Report mailed Apr. 25, 2014 for European Patent Application No. 11854171.3, 5 pages.

Translated the Japanese Office Action mailed Mar. 17, 2015 for Japanese patent application No. 2013-547543, a counterpart foreign application of U.S. Appl. No. 12/981,056, 10 pages.

"Use of Rental Service", Nikkei Electronics, No. 742, pp. 173-175, Nikkei Business Publications, Inc., Japan, May 3, 1999.

* cited by examiner

ELECTRONIC BOOK RENTALS

BACKGROUND

In some situations, individuals may prefer to rent a book from a content provider rather than purchase the book. For instance, individuals that want access to the content of a book or a portion of a book for a limited amount of time may be able to save money by renting the book, rather than buying the book. In a particular illustration, students may prefer to rent their textbooks because the students may only utilize the textbooks for a specified amount of time, such as a semester or a quarter.

However, a book rental experience may be inconvenient because individuals renting books may still need to return the books to the content provider. In some cases, the individuals may return rented books by visiting a location of the content provider. In other cases, the individuals may return rented books by shipping the books back to the content provider.

Certain individuals may also find the use of physical books to be undesirable. In particular, individuals may find it inconvenient to carry one or more physical books from one location to another, especially in situations where the books are heavy and/or awkward to carry. Additionally, the storage of physical books may occupy a large amount of space. Although, some content providers have started to offer rental options with respect to electronic books, these content providers provide limited options and features with respect to electronic book rentals.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes architectures and techniques directed to renting electronic books. In particular, a content provider can rent electronic books to individuals for a specified period of time. The period of time specified to rent electronic books may be referred to herein as the "rental term" or the "rental period."

Additionally, the individuals may have the option to modify the rental term for an electronic book. For example, individuals may have options related to extending the rental term. In another example, individuals may have the option to decrease the rental term. Further, content providers may allow individuals to convert the rental of the electronic book to the purchase of the electronic book. In addition, individuals may convert the purchase of an electronic book to a rental of the electronic book for a particular period of time.

In order to rent the electronic books to individuals, the content provider may acquire permission from the publisher(s) of the electronic books to rent the electronic books. The content provider may provide payment to the publisher for permission to rent the electronic books according to a number of models. In some cases, the content provider may provide payment to the publisher based on a transaction formula that takes into account one or more variables. In other cases, the content provider may acquire a portfolio of time-bound licenses related to an electronic book that can be used to rent the electronic book.

Renting electronic books according to the architectures and techniques described herein improve an individual's experience with renting electronic books by providing flexibility in the rental term options offered to the individual by the content provider. Additionally, a content provider's experience with renting electronic books may be enhanced by utilizing models for acquiring permission from publishers to rent electronic books that can increase revenue and minimize the inventory of electronic books held by the content provider at a given time.

Some implementations of the architecture and techniques described herein are described in the context of electronic books. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listen to, or otherwise experience.

Example Architecture

Figure 1:
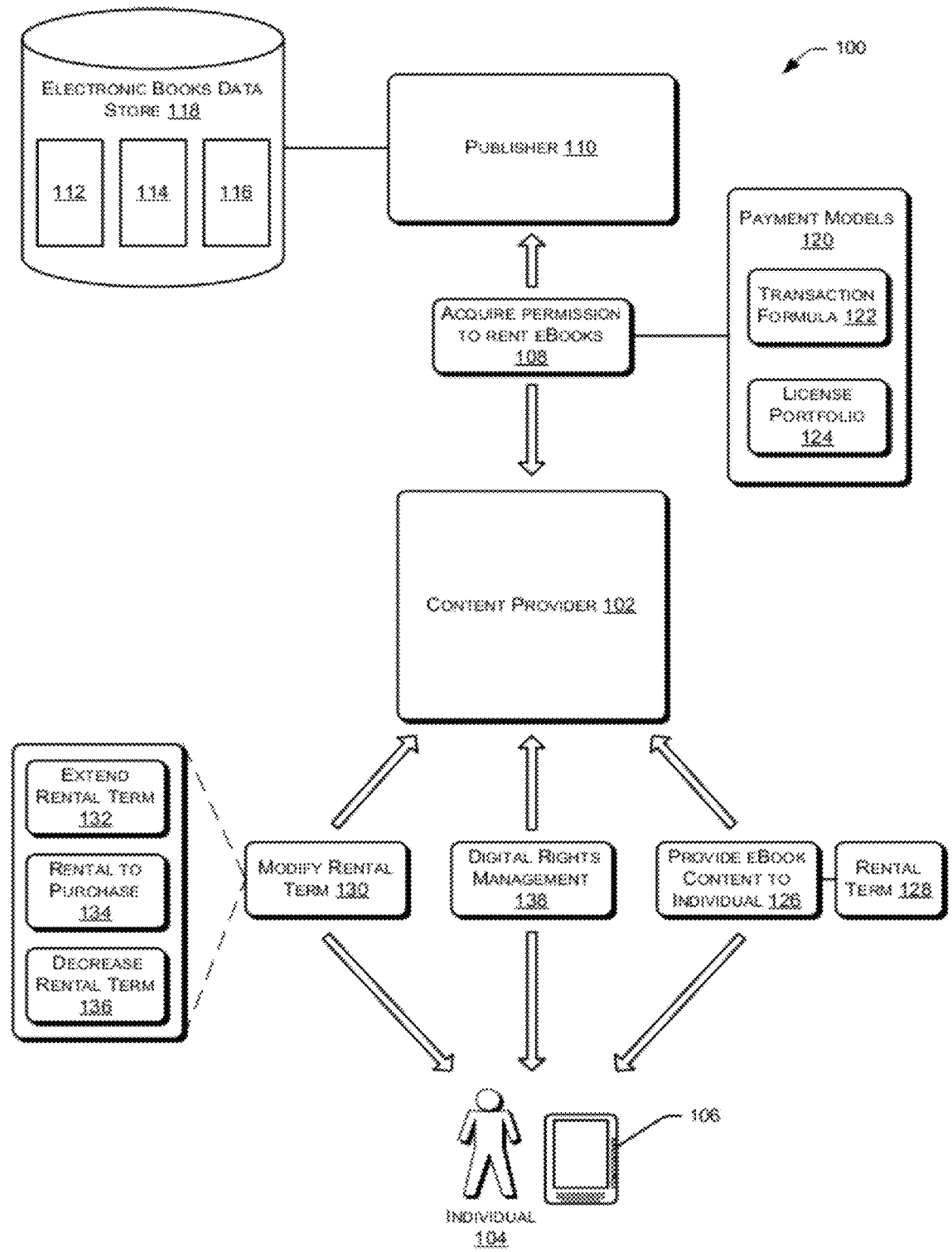
FIG. 1 illustrates an architecture to rent electronic books.

FIG. 1 illustrates an architecture 100 to rent electronic books. The architecture 100 includes a content provider 102 that may rent electronic books to one or more individuals, such as individual 104. Content of the electronic books may be provided to one or more client devices of the individual 104, such as client device 106. Although the client device 106 of FIG. 1 is shown as an electronic reader device, the client device 106 may include a desktop computer, a laptop computer, a smart phone, a mobile handset, a personal digital assistant (PDA), a portable navigation device, a portable gaming device, a tablet computer, a watch, a portable media player, another computing device, and the like.

At 108, the content provider 102 may acquire permission from the publisher 110 to rent electronic books provided by the publisher 110 For example, the content provider 102 may acquire permission to rent electronic books 112-116 stored in an electronic books data store 118 coupled to the publisher 110. The content provider 102 may provide payment to the publisher 110 for acquiring permission to rent the electronic books 112-116 according to one or more payment models 120. In some implementations, the service provider 102 may provide payment to the publisher 110 according to a transaction formula 122. For example, when the content provider 102 rents an electronic book, such as the electronic book 114, to an individual, the transaction formula 122 may be applied to determine a payment amount to the publisher 110. In certain situations, the publisher 110 may be provided a flat fee each time that the electronic book 114 is rented to an individual. In other scenarios, the content provider 102 may provide a payment to the publisher 110 based on certain variables, such as a total number of rentals of the electronic book 114, a length of the rental term, and the like.

In other implementations, the content provider 102 may acquire a license portfolio 124 that can be utilized to rent one or more of the electronic books 112-116 and determine payment to the publisher 110 for permission to rent the electronic books 112-116. In a particular example, the license portfolio 124 may represent a number of rentals of the electronic book 114 that can be in effect at a particular time. When an individual, such as the individual 104, requests to rent the electronic book 114, the content provider 102 may allocate one of the licenses 124 to the individual 104. Allocating the license 124 to the individual 104 decreases the number of available rentals of the electronic book 114 by one. In addition, after the rental term expires, the number of available rentals of the electronic book 114 increases by one. In some scenarios, the content provider 102 may provide a payment to the publisher 110 each time that one of the licenses 124 is allocated to an individual to rent one of the electronic books 112-116. In other instances, the content provider 102 may provide a one-time payment to the publisher 110 in order to acquire each of the licenses 124.

In an illustrative implementation, at 126, the content provider 102 may provide content of the electronic book 114 to the client device 106. In some cases, the content provider 102 may provide content of the electronic book 114 to the client device 106 in response to receiving a request from the client device 106 to rent the electronic book 114. In certain situations, the content provider 102 may provide a portion of the electronic book 114 to the client device 106. For example, as the individual 104 is reading the electronic book 114, the client device 106 may request the portion of the electronic book 114 that the individual 104 is reading at a particular time. In other situations, the content provider 102 may provide the entire content of the electronic book 114 to the client device 106 and the client device 106 may store the electronic book 114 in memory.

The content provider 102 may rent electronic books to the individual 104 for a specified rental term 128. The rental term 128 may be a period of time that the individual 104 can access content of the electronic books, such as 30 days, 90 days, and so on. In certain situations, the rental term 128 may change. For example, at 130, the individual 104 may modify the rental term 128 of an electronic book, such as the electronic book 114. The rental term 128 of the electronic book 114 may be modified in a number of ways. To illustrate, at 132, the rental term 128 may be extended. Thus, the individual 104 may request to access content of the electronic book 114 for a longer period of time, such as extending the rental term from 30 days to 90 days. Additionally, at 134, the individual 104 may convert a rental of the electronic book 114 to a purchase. In this way, the individual 104 may obtain permission for unlimited access to the content of the electronic book 114. Further, at 136, the individual 104 may decrease the rental term of the electronic book 114, such as from 180 days to 90 days. In other situations, the individual 104 may convert a purchase of the electronic book 114 to a rental of the electronic book 114 for a specified rental term.

The content provider 102 and the client device 106 may also exchange information at 138 related to digital rights management. For example, the content provider 102 may provide metadata to the client device 106 indicating the rental term 128 of the electronic book 114. In some cases, the client device 106 may utilize the digital rights management metadata to determine when the rental term 128 expires and prevent subsequent access to the electronic book 114. In another example, the service provider 102 may determine when the rental term 128 expires and send communications to the client device 106 to remove any content of the electronic book 114 from the client device 106 and prevent further access of the electronic book 114.

Example Electronic Book Rental Model

Figure 2:
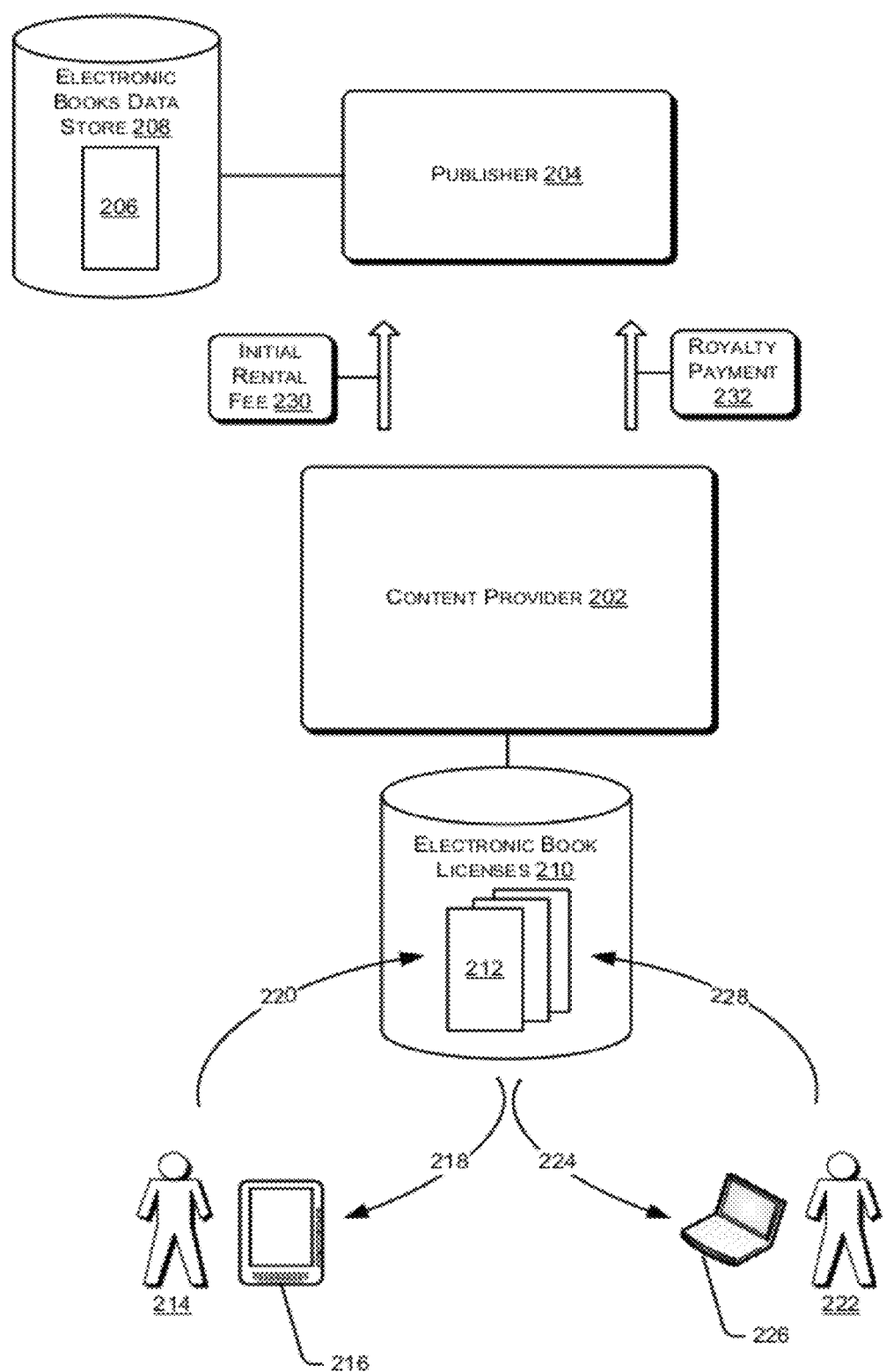
FIG. 2 illustrates a model of renting electronic books utilizing a portfolio of time-bound licenses.

FIG. 2 illustrates a model of renting electronic books utilizing a portfolio of time-bound licenses. FIG. 2 illustrates a content provider 202 that acquires time-bound rentable licenses from a publisher 204 that are allocated to individuals as the individuals rent the electronic books associated with the licenses. In particular, the content provider 202 may acquire a number of licenses that provide permission to rent electronic book 206 stored in an electronic book data store 208. The licenses of the electronic book 206 may be stored in an electronic book licenses data store 210 coupled to, or otherwise accessible to the content provider 202. In some instances, the electronic book licenses data store 210 may store a pool or portfolio of licenses that can be allocated to electronic book rental customers of the content provider 202. In the example shown in FIG. 2, the electronic book licenses data store 210 stores licenses 212 of the electronic book 206. The licenses 212 represent a number of rentals of the electronic book 206 that may be in effect at a particular time. In certain situations, one or more of the licenses 212 may be allocated for a fixed period of time, such as 30 days, while in other situations one or more of the licenses 212 may be allocated for a variable period of time set by rental customers of the content provider 202.

In an illustrative implementation, when an individual, such as individual 214, requests to rent the electronic book 206 from the content provider 202 via a client device 216, the content provider 202 may, at 218, allocate one of the licenses 212 to the individual 214. When one of the licenses 212 is allocated to the individual 214, the number of licenses 212 available to be allocated for rentals of the electronic book 206 may decrease by one. In some cases, allocating the license 212 to the individual 214 may include providing permission to the client device 216 that allows access to content of the electronic book 206 by the client device 216 for a specified period of time associated with the license 212. In some cases, the permission sent to the client device 216 may be provided in the form of metadata of the electronic book 206, such as one or more keys, one or more vouchers, one or more tokens, one or more certificates, or combinations thereof, that can be utilized to access content of the electronic book 206.

After the period of time associated with the license 212 allocated to the individual 214 expires, the permission to access the content of the electronic book 206 may be removed from the client device 216 at 220. Consequently, the number of licenses 212 that are available for rental of the electronic book 206 increases by one. In some cases, the client device 216 may send the permission back to the content provider 202, while in other cases, the content provider 202 may communicate with the client device 216 to delete the permission from memory of the client device 216.

The content provider 202 may also rent the electronic book 206 to the individual 222 by allocating one of the licenses 212 to the individual 222 at 224. For example, the individual 222 may utilize a client device, such as client device 226, to request to rent the electronic book 206 for a specified rental term. In certain instances, the license 212 allocated to the individual may be the same license 212 that was allocated to the individual 214, while in other instances a different license 212 may be allocated to the individual 214. In either case, the rental term of the electronic book 206 for the individual 222 may be the same or different from the rental term of the electronic book 206 for the individual 214. In response to allocating one of the licenses 212 to the individual 222, the content provider 202 may send metadata indicating permission to access content of the electronic book 206 to the client device 226. Thus, the individual 222 can access content of the electronic book 206 for the period of time associated with the license 212. After the period of time associated with the license 212 expires, the permission may be removed from the client device 226 at 228. In some instances, one or more of the licenses 212 may be associated with a maximum number of allocations, such that a particular license 212 can be allocated to individuals up to the specified maximum number of allocations.

The content provider 202 may also provide payment to the publisher 204 for the rental of electronic books. In a particular implementation, at 230, an initial rental fee may be provided to the publisher 204 from the content provider 202 when one of the licenses 212 associated with electronic book 206 is first allocated to an individual requesting to rent the electronic book 206. Subsequent rentals of the electronic book 206 may be followed by a royalty payment, at 232, from the content provider 202 to the publisher 204. In some cases, the royalty payment may be a certain portion of the initial rental fee.

Example System

Figure 3:
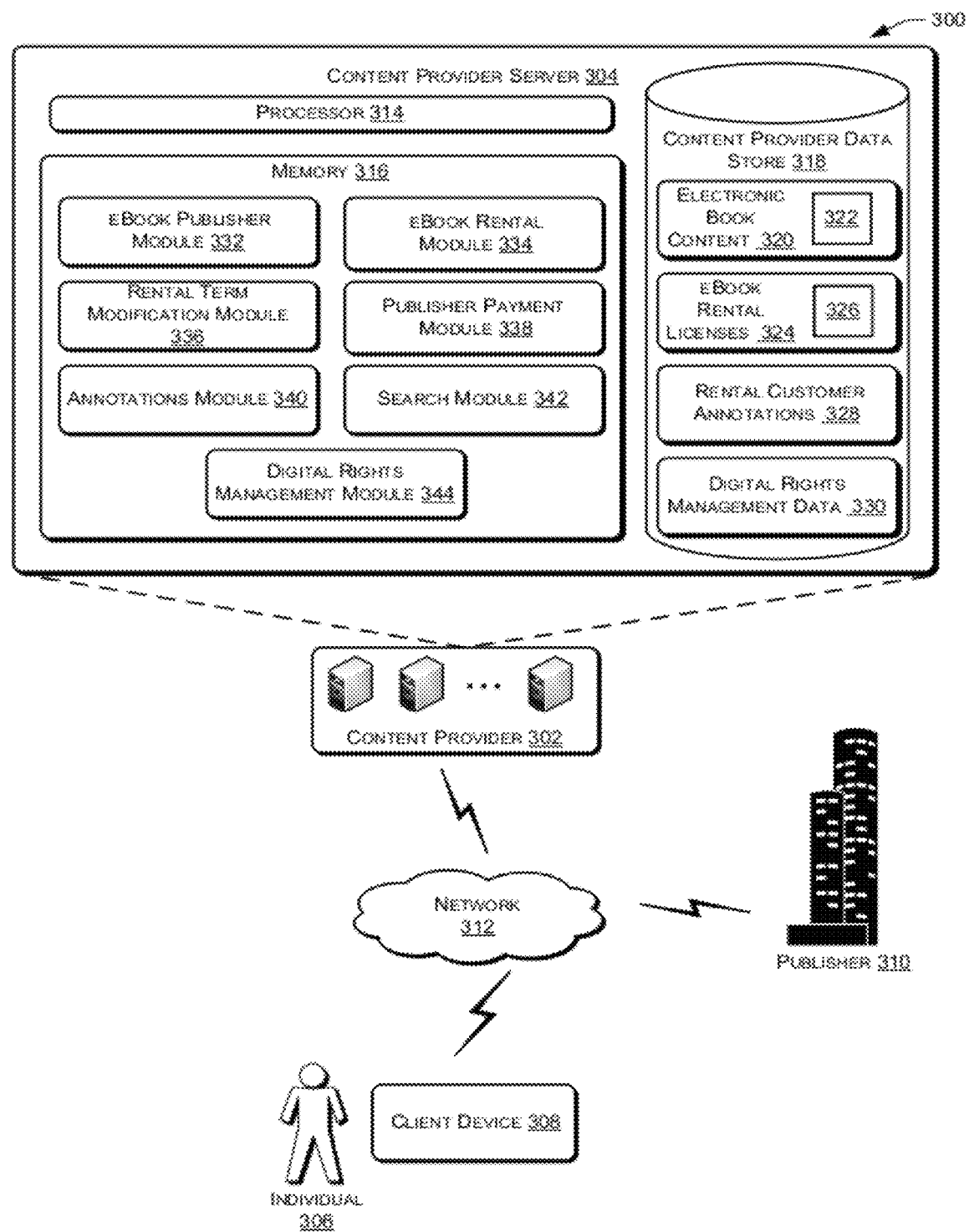
FIG. 3 illustrates components of a content provider server to rent electronic books.

FIG. 3 illustrates components of a system 300 to rent electronic books. The system 300 includes a content provider 302 with a content provider server 304 that may comprise a single server, a cluster of servers, a server farm or data center, and so forth, although other server architectures (e.g., a mainframe architecture) may also be used. In a particular implementation, the content provider server 304 may rent electronic books to individuals, such as individual 306. The individual 306 may receive the electronic books via a client device 308. Additionally, the content provider 302 may obtain permission to rent the electronic books from one or more publishers, such as publisher 310.

The content provider server 304, the client device 308, and one or more computing devices (not shown) of the publisher 310 may exchange communications via a network 312. The network 312 may be representative of any one or combination of multiple different types of wired and wireless networks, such as the Internet, cable networks, satellite networks, wide area wireless communication networks, wireless local area networks, and public switched telephone networks (PSTN).

The content provider server 304 includes one or more processors indicated by the processor 314. The content provider server 304 also includes memory 316 that is accessible by the processor 314. The memory 316 is an example of computer readable storage media and may include volatile memory, nonvolatile memory, removable memory, non-removable memory, or a combination thereof. For example, the memory 316 may include, but is not limited to, RAM, ROM, EEPROM, flash memory, one or more hard disks, solid state drives, optical memory (e.g. CD, DVD), or other non-transient memory technologies. The memory 316 may store a number of modules including computer-readable instructions executable by the processor 314 to rent electronic books to individuals.

The content provider server 304 may include or otherwise be coupled to a content provider data store 318 that may include a number of mass storage devices, such as a redundant array of independent disks (RAID). The content provider data store 318 may store electronic book content 320. The electronic book content 320 may include content of a number of electronic books, such as electronic book 322, that may be rented by the content provider 302 to one or more individuals. In some cases, the content provider 302 may acquire the electronic book content 320 from one or more publishers, such as the publisher 310. Additionally, the electronic book content 320 may include supplemental content, such as commentary, annotations, and/or notes associated with certain electronic books. In certain instances, the commentary, annotations, and/or notes may be provided by an author of a particular electronic book or an expert in a field related to the particular electronic book. The supplemental content may also include image content, video content, audio content, and the like, that is related to electronic books acquired by the content provider 302.

The content provider data store 320 also stores electronic book rental licenses 324. The electronic book rental licenses 324 may indicate permission to access content of a particular electronic book. For example, an electronic book rental license 326 associated with the electronic book 322 may be allocated to an individual to access content of the electronic book 322. In some cases, the content of the electronic book 322 may be accessed by downloading the entire content of the electronic book 322 from the content provider 302. In other cases, a portion of the content of the electronic book 322 may be obtained based on a section of the electronic book 322 that an individual is consuming at a particular time. In certain situations, the electronic book rental license 326 may be allocated in order to access content associated with the electronic book 322 via the publisher 310 or another distributor of electronic books, rather than the content provider 302. The electronic book rental licenses 324 may be part of one or more portfolios of licenses that can be allocated to individuals requesting to rent electronic books. Each of the portfolios of licenses may represent a total number of rentals of a particular electronic book that can be allocated at a given time.

The content provider data store 318 may also store rental customer annotations 328. In particular, individuals renting electronic books from the content provider 302 may make annotations related to the electronic books being rented. In some cases, the rental customer annotations 328 may include notes, links, highlighted portions of electronic books, and/or other content related to electronic books that rental customers may associate with the electronic books. The rental customer annotations 328 may be stored by the content provider 302 for access by the electronic book rental customers. In some instances, the content provider 302 may provide access to annotations of electronic book rental customers via one or more pages of a site of the content provider, such as content provider account pages corresponding to respective electronic book rental customers.

Further, the content provider data store 318 stores digital rights management data 330. The digital rights management data 330 may indicate rental term information associated with electronic books that are rented by individuals from the content provider 302. For example, the digital rights management data 330 may indicate when the respective rental term for certain electronic books is set to expire, an amount of time before the rental term for the electronic books expires, and so forth. In some scenarios, the digital rights management data 330 may be metadata provided in association with the electronic book content 320 of particular electronic books. In some situations, the digital rights management data 330 may include one or more keys, one or more vouchers, one or more tokens, one or more certificates, or a combination thereof.

The memory 316 stores an electronic book publisher module 332 that is executable by the processor 314 to acquire permission from the publisher 310 for the content provider 302 to rent electronic books. In a particular implementation, the electronic book publisher module 332 may obtain permission from the publisher 310 to rent a particular electronic book, such as the electronic book 322, by agreeing to provide payments to the publisher 310 according to a transaction formula. The transaction formula may include one or more variables that are utilized to determine a payment amount.

In other implementations, the electronic book publisher module 332 may acquire permission from the publisher 310 for the content provider 302 to rent electronic books by acquiring a number of rentable licenses for the electronic books to be rented. Each of the rentable licenses may be associated with a particular rental term. The electronic book publisher module 332 may acquire licenses of varying rental terms for each electronic book that is being rented. For example, the electronic book publisher module 332 may acquire a number of 30-day licenses, a number of 90-day licenses, a number of 180-day licenses, and so on, for the electronic book 322. The electronic book publisher module 332 may also acquire a number of licenses that have variable rental terms. In this way, the content provider 302 can rent electronic books to individuals for rental periods that are customized for the needs of particular individuals.

In certain scenarios, the licenses acquired by the content provider 302 to rent electronic books may be associated with a maximum number of allocations. In an illustrative implementation, the license 326 may be associated with three (3) rental allocations of the electronic book 322. Thus, the content provider 302 can allocate the license 326 three (3) times to rent the electronic book 322 to one or more individuals for the duration of the rental term of the license 326.

The memory 316 also stores an electronic book rental module 334 that is executable by the processor 314 to rent electronic books to individuals. In some cases, the electronic book rental module 334 may receive requests from individuals to rent an electronic book from the content provider 302 for a specified term. In an illustrative implementation, the electronic book rental module 334 may receive a request to rent the electronic book 322 from the individual 306 via the client device 308. In some cases, the electronic book rental module 334 may conduct a financial transaction with respect to the rental of the electronic book 322 to receive a payment from the individual 306 for renting the electronic book 322.

The electronic book rental module 334 may also provide metadata to the client device 308, where the metadata indicates permission to access content of the electronic book 322. For example, after receiving a request to rent the electronic book 322, the electronic book rental module 334 may then send the content of the electronic book 322 to the client device 308 for local storage at the client device 308. Additionally, the electronic book rental module 334 may send metadata of the electronic book 322 to client device 308, where the metadata includes vouchers, keys, certificates, tokens, etc., that can be utilized to access the content of the electronic book 322. In some situations, the individual 306 may specify delivery of the electronic book 322 to other client devices of the individual 306, to a remote storage space of the individual 306, or combinations thereof.

Additionally, when the content provider 302 has acquired licenses from the publisher 310 regarding the electronic book 322, the electronic book rental module 334 may allocate one of the licenses associated with the electronic book 322, such as the license 326, to the individual 306. The electronic book rental module 334 may decrease the number of licenses available to be allocated to rent the electronic book 322 by one in response to allocating the license 326 to the individual 306. The license allocated to the individual 306 may depend on the rental term for the electronic book 322. For example, for a rental term of 90 days specified in a rental request by the individual 306, the electronic book rental module 334 may allocate a 90-day rental license associated with the electronic book 322 to the individual 306. Further, the license allocated to the individual 326 may be associated with a variable rental term that can correspond to a length of time requested by the individual 326 to rent the electronic book 322.

After allocating a license associated with the electronic book 322 to the individual 306, the electronic book rental module 334 may provide the content of the electronic book 322 to the client device 308. The electronic book rental module 334 may also provide metadata of the electronic book 322 to the client device 308. In some cases, the metadata may indicate permission for the individual 306 to access content of the electronic book 322. For example, the electronic book rental module 334 may send keys, vouchers, tokens, certificates, and so on, related to the electronic book 322 to the client device 308. In this way, the individual 306 can access content of the electronic book 322 via the client device 308. The metadata for the electronic book 322 provided to the client device 308 may also indicate the rental term for the electronic book 322.

In certain cases, the electronic book rental module 334 may provide a portion of the content of the electronic book 322 to the client device 308. For example, after permission has been provided to the client device 308 to access content of the electronic book 322, the electronic book rental module 334 may send a portion of the electronic book 322 to the client device 308 corresponding to the portion of the electronic book 322 being consumed by the individual 306 at a particular time. To illustrate, when the individual 306 is reading a particular page or pages of the electronic book 322, the electronic book rental module 334 may send the particular page or pages of the electronic book 322 to the client device 308. The electronic book rental module 334 may also send additional content of the electronic book 322 to the client device 308, such as one or more pages subsequent to the particular page or pages being consumed, one or more pages preceding the particular page or pages being consumed, supplemental content associated with the particular page or pages being consumed, predicted content that may be subsequently consumed by the individual 306 (e.g. predicting a next article that may be read based on past reading history), and so forth. The electronic book rental module 334 may send at least some of the content of the electronic book 322 to the client device 308 in response to receiving a request from the client device 308 for the content. In situations where the content of the rented electronic books is sent to individuals in portions based on current and/or future consumption by the individuals, the electronic book rental module 334 may send metadata to the client device 308 indicating that the individual 306 can access the particular portions of the electronic book 322 requested by the electronic book rental module 334.

When the rental term for the electronic book 322 expires, the electronic book rental module 334 may prevent access to content of the electronic book 322. In some cases, the electronic book rental module 334 may cause content of the electronic book 322 to be removed from local storage of the client device 308 and prevent further downloading of the content of the electronic book 322 to the client device 308. For example, the electronic book rental module 334 may specify that a permission provided to the individual 306 has expired and deny further requests to access content of the electronic book 322 by the individual 306. In a particular implementation, the electronic book rental module 334 may modify metadata of the electronic book 322 to indicate that access to at least a portion of the electronic book 322 is prohibited. Further, when the rental term of the electronic book 322 expires, the electronic book rental module 334 may increase a number of licenses available to allocate to individuals to rent the electronic book 322 by one.

Further, the memory 316 stores a rental term modification module 336 that is executable by the processor 314 to modify rental terms associated with electronic books rented by the content provider 302. In particular, the rental term modification module 336 may modify the rental term associated with the electronic book 322 in response to a request received from the individual 306 via the client device 308. In some cases, the rental term may be extended, such as from 30 days to 90 days. In other cases, the rental term may be decreased. In still other situations, the individual 306 may request to convert rental of the electronic book 322 to a purchase of the electronic book 322. The rental term modification module 336 may also convert purchases of the electronic book 322 to rentals.

In order to change the rental term for the electronic book 322, the rental term modification module 336 may modify the metadata provided to the individual 306 with respect to accessing content of the electronic book 322. For example, the rental term modification module 336 may modify the metadata provided to the client device 308 to provide access to the electronic book 322 for a greater amount of time or a lesser amount of time. To illustrate, the rental term modification module 336 may send modifications of the metadata of the electronic book 322, such as modifications to vouchers, keys, certificates, tokens, and so forth, to the client device 308.

In situations, where the license 326 is associated with a fixed rental term, the rental term modification module 336 may return the license 326 granted to the individual 306 with respect to an initial rental term requested by the individual 306 and allocate a different license to the individual 306 that is associated with the modified rental term. To illustrate, the rental term modification module 336 may return a 90-day license granted to the individual 306 in response to an initial rental request and provide a 180-day license to the individual 306 upon receiving a request from the individual 306 to increase the rental term to 180 days. In this situation, the rental term modification module 336 may provide metadata of the electronic book 322 to the client device 308 indicating the new rental term, an amount of the previous rental term that has elapsed, and so forth.

In some cases, the rental term modification module 336 may send reminders to individuals that their respective rental terms are going to expire. In an illustrative implementation, the rental term modification module 336 may send an email, text message, or other form of communication to the individual 306 that the rental period for the electronic book 322 is going to expire in a certain period of time (e.g. 7 days, 24 hours, etc.). The reminders may include one or more links that are selectable to extend the rental term for the electronic book 322. The rental term modification module 336 may also send notification to the individual 306 that a requested extension of the rental term of the electronic book 322 may meet or exceed the purchase price of the electronic book 332. In these cases, the rental term modification module 336 may provide an option for the individual 306 to convert the rental of the electronic book 322 to a purchase of the electronic book 322.

In situations where the rental term is extended or a rental of the electronic book is 322 converted to a purchase, the rental term modification module 332 may obtain payment from the individual 306 in response to a request to extend the rental term of the electronic book 322. Further, in situations where the rental term of the electronic book 322 is decreased or a purchase of the electronic book 322 is converted to a rental, the rental term modification module 336 may refund value to the individual 306 based on the decrease of the rental term. In some cases, the refund of value to the individual 306 may include adding value to an account of the individual 306 with the content provider 302 that can be used for future acquisition of content from the content provider 302, adding value to an account of the individual 306 with a financial institution, and the like.

The memory 316 also stores a publisher payment module 338 that is executable by the processor 314 to provide payment to the publisher 310 for electronic books rented by the content provider 302 that were obtained from the publisher 310. In a particular implementation, the publisher payment module 338 may cause a payment to be made to the publisher 310 each time a license provided to the content provider 302 for a particular electronic book is allocated to an individual. In some cases, the royalty payment module 338 may provide different payments to the publisher 310 for rental of an electronic book based on the number of rentals associated with a particular license. For example, the royalty payment module 338 may cause a payment of a specified amount to be provided to the publisher 310 for an initial rental of the electronic book 322 and provide payments of a lesser amount to the publisher 310 for subsequent rentals of the electronic book 322. In certain situations, the amounts of subsequent payments made to the publisher 310 for rental of the electronic book 322 may decrease in steps until a minimum payment amount is achieved. In addition, the amount of a payment to the publisher 310 may depend on the duration of a particular license, a maximum number of times that the particular license can be allocated, etc.

Further, the publisher payment module 338 may provide a payment to the publisher 310 according to a transaction formula. The transaction formula may include a number of variables that can contribute to determining a payment amount to the publisher 310. In certain situations, the publisher payment module 338 may use a transaction formula specifying that the publisher 310 is provided with a payment of a particular amount each time that an electronic book is rented. In other instances, the publisher payment module 338 may determine a payment amount to the publisher 310 based on a total number of rentals of an electronic book, a rental term for the electronic book, and so on.

Additionally, the memory 316 stores an annotations module 340 that is executable by the processor 314 to store and provide access to annotations made by individuals renting electronic books from the content provider 302. For example, as the individual 306 makes annotations with respect to the electronic book 322, the annotations module 340 may receive the content of the annotations and store these annotations in the content provider data store 318. The annotations of the electronic book 322 may include notes made by the individual 306, portions of the electronic book 322 highlighted by the individual 306, supplemental content associated with the electronic book 322 by the individual 306, and so forth.

The annotations module 340 may also provide access to the annotations made by the individual 306. In some cases, the annotations module 340 may receive requests from the client device 308 for specific annotations of the electronic book 322 and subsequently provide the requested annotations. In other situations, the annotations module 340 may provide annotations associated with a portion of the electronic book 322 that is currently being consumed, such as the annotations of a portion of the electronic book 322 currently being viewed by the individual 306. The annotations module 340 may also provide access to annotations of the electronic book 322 made by the individual 306 via one or more pages of a site provided by the content provider 302. For example, the individual 306 may log into an account of the individual 306 with the content provider 302 and access annotations made by the individual 306 via a home page of the individual 306 on a site of the content provider 302.

The annotations module 336 may also provide access to at least a portion of the annotations of the electronic book 322 by the individual 306 after the rental term of the electronic book 322 has expired. In particular, the individual 306 may still retain permission to access at least a portion of the annotations of the electronic book 322 after the rental term for the electronic book 322 has expired. In an illustrative implementation, when the rental term of the electronic book 322 expires, the electronic book rental module 334 may modify metadata of the electronic book 322 to indicate that access by the individual 306 to annotations of the electronic book 322 is permitted, while still prohibiting access to other portions of the content of the electronic book 322.

The memory includes a search module 342 that is executable by the processor 316 to provide searches of content of electronic books rented by the content provider 302. In certain cases, the search module 342 may receive search requests from the client device 308 related to whether particular keywords are included in the electronic book 322. In response to the search requests, the search module 342 may provide content from the electronic book 322, annotations of the electronic book 322, supplemental content of the electronic book 322, or combinations thereof. Further, the search module 342 may provide search results for at least a portion of the content associated with the electronic book 322 after the rental term for the electronic book 322 expires.

Further, the memory 316 stores a digital rights management module 344 that is executable by the processor 316 to determine when the rental terms of electronic books rented by the content provider 302 expire. In some cases, the digital rights management module 344 may determine an indication of time that has elapsed since a particular electronic book has been rented. By comparing this indication of time to the rental term of the particular electronic book, the digital rights management module 344 may determine whether the rental term of the particular electronic book has expired. In an illustrative example, when the rental term of the electronic book 322 has expired, the digital rights management module 344 may invoke the electronic book rental module 334 to modify metadata of the electronic book 322 to indicate that the rental term for the electronic book 322 has expired and to prevent further access to the electronic book 322 by the individual 306. In another example, the digital rights management module 344 may modify the metadata of the electronic book 322 to indicate that the rental term for the electronic book 322 has expired and prevent subsequent access to the electronic book 322 by the individual 306. The digital rights management module 344 may also send information to the client device 308 indicating whether the rental term of the electronic book 322 has expired, such that the client device 308 can perform operations to restrict access to the electronic book 322 by the individual 306.

Example Client Device

Figure 4:
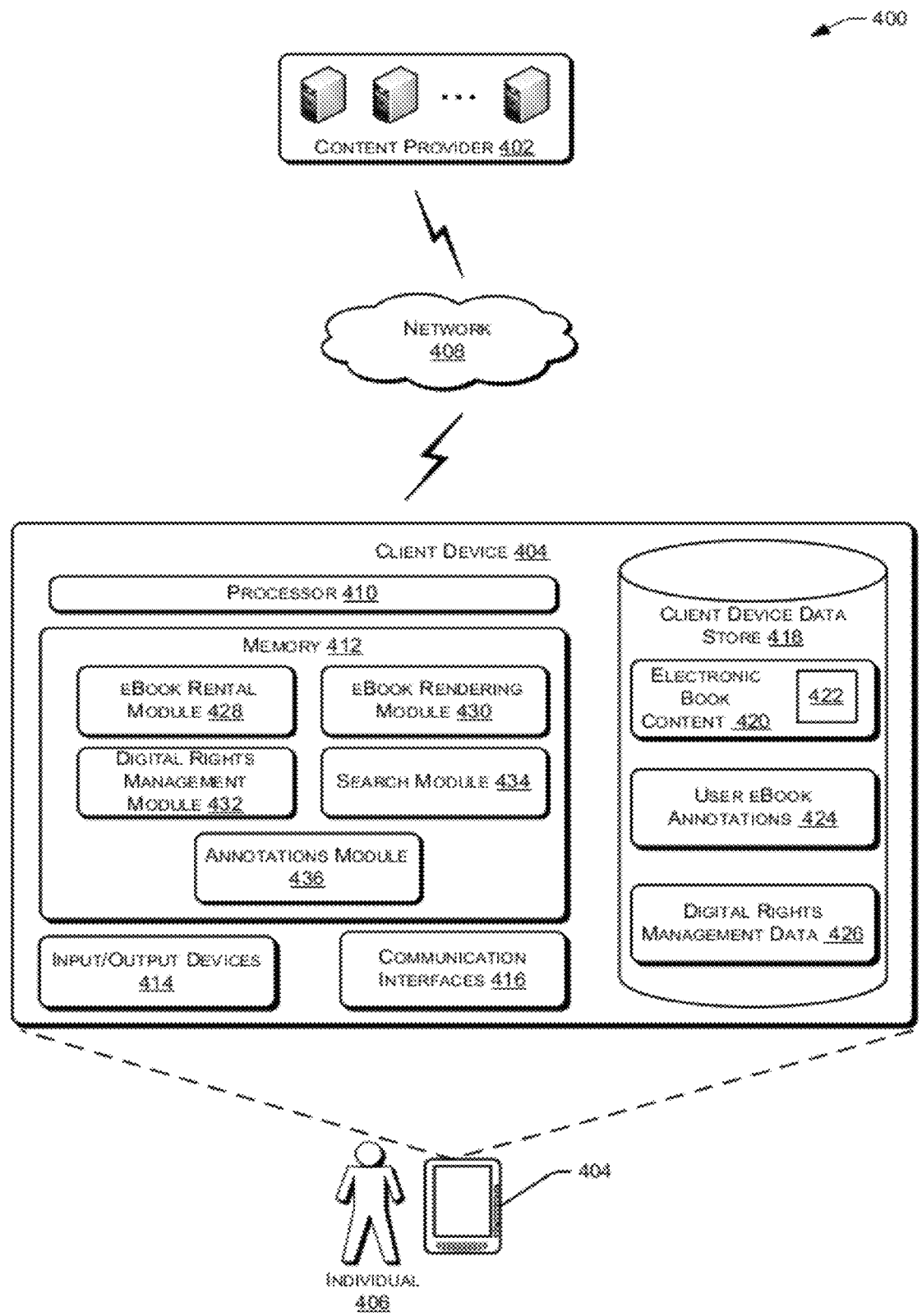
FIG. 4 illustrates components of a client device to rent electronic books.

FIG. 4 illustrates components of a system 400 to rent electronic books. The system 400 includes a content provider 402 that may include one or more servers, one or more data stores, and so on. The components of the content provider 402 may be the same or similar to the components of the service provider 302 of FIG. 3. The system 400 also includes a client device 404 that may be operated by one or more individuals, such as individual 406. Although the client device 404 of FIG. 4 is shown as an electronic reader device, the client device 404 may include a desktop computer, a laptop computer, a smart phone, a mobile handset, a personal digital assistant (PDA), a portable navigation device, a portable gaming device, a tablet computer, a watch, a portable media player, another computing device, and the like. The service provider 402 and the client device 404 may communicate via a network 408. The network 408 may be representative of any one or combination of multiple different types of wired and wireless networks, such as the Internet, cable networks, satellite networks, wide area wireless communication networks, wireless local area networks, and public switched telephone networks (PSTN).

The client device 404 includes one or more processors indicated by processor 410. The client device 404 also includes memory 412 that is accessible by the processor 410. The memory 412 is an example of computer readable storage media and may include volatile memory, nonvolatile memory, removable memory, non-removable memory, or a combination thereof. For example, the memory 412 may include, but is not limited to, RAM, ROM, EEPROM, flash memory, one or more hard disks, solid state drives, optical memory (e.g. CD, DVD), or other non-transient memory technologies. The memory 412 may store a number of modules including computer-readable instructions executable by the processor 410 to rent electronic books from the content provider 402.

Additionally, the client device 404 includes one or more input/output devices 414. The one or more input/output devices 414 may include a keyboard, a pointer device (e.g. mouse), a microphone, a touchpad, speakers, a display device, a touch screen display, and the like. The client device 404 may also include one or more communication interfaces 416 to communicate via the network 408 with other computing devices, such as computing devices of the content provider 402, other client devices, and so forth.

The client device 404 may also include or otherwise be coupled to a client device data store 418. In some cases, the client device data store 418 may be an internal memory device of the client device 404, while in other cases, the client device data store 418 may be a memory device that is external to the client device 404. The client device data store 418 may store electronic book content 420. The electronic book content 420 may include content of one or more electronic books, such as electronic book 422, that may be rented by the individual 406 from the content provider 402. Additionally, the electronic book content 420 may include supplemental content, such as commentary, annotations, and/or notes associated with certain electronic books. In certain instances, the commentary, annotations, and/or notes may be provided by an author of a particular electronic book or an expert in a field related to the particular electronic book. The supplemental content may also include image content, video content, audio content, and the like, that is related to electronic books acquired by the individual 406.

The client device data store 418 also stores user electronic book annotations 424. For example, the user electronic book annotations 424 may include annotations provided by a user of the client device 404, such as the individual 406. In some cases, the user electronic book annotations 424 may include notes, links, highlighted portions of electronic books, and/or other content related to electronic books that the individual 406 may associate with the electronic books.

Further, the content provider data store 418 stores digital rights management data 426. The digital rights management data 426 may indicate rental term information associated with electronic books that are rented by the individual 406 from the content provider 402. For example, the digital rights management data 426 may indicate when the respective rental term for certain electronic books is set to expire, an amount of time before the rental term for the electronic books expires, and so forth. In some scenarios, the digital rights management data 426 may be metadata provided in association with the electronic book content 420 of particular electronic books. In a particular implementation, the digital rights management data 426 may include one or more keys, one or more vouchers, one or more tokens, one or more certificates, or a combination thereof, that are provided in association with the electronic book content 420.

The memory 412 stores an electronic book rental module 428 that is executable by the processor 410 to rent electronic books from the content provider 402. In particular, the electronic book rental module 428 may send a rental request to the content provider 402 to rent one or more electronic books, such as the electronic book 422. In some cases, rental requests sent by the electronic book rental module 428 may specify a rental term. For example, the electronic book rental module 428 may send a request to the content provider 402 to rent the electronic book 422 from the content provider 402 for 90 days.

After sending a rental request to the content provider 402 for the electronic book 422, the electronic book rental module 428 may receive metadata from the content provider 402 to access content of the electronic book 422. The metadata of the electronic book 422 may indicate permission to access content of the electronic book 422. The metadata may include one or more vouchers, one or more keys, one or more certificates, one or more tokens, and so forth. The electronic book rental module 428 may utilize the metadata of the electronic book 422 to obtain at least a portion of the content of the electronic book 422 from the content provider 402. In some cases, at least some of the content of the electronic book 422 obtained from the content provider 402 is stored in the client device data store 418, while in other cases, content of the electronic book 422 may be cached in a temporary memory device of the client device 404.

The electronic book rental module 428 may also send requests to the content provider 402 to modify rental terms of electronic books rented from the content provider 402. In one example, the electronic book rental module 428 may send a request to the content provider 402 to extend the rental term of the electronic book 422. In another example, the electronic book rental module 428 may send a request to the content provider 402 to decrease the rental term of the electronic book 422. Further, the electronic book rental module 428 may send a request to the content provider 402 to convert a purchase of the electronic book 422 to a rental of the electronic book 422 or to convert a rental of the electronic book 422 to a purchase.

Upon sending a request to the content provider 402 to modify the rental term of the electronic book 422, the electronic book rental module 428 may modify metadata of the electronic book 422 to reflect the modified rental term. In some cases, the electronic book rental module 428 may receive metadata from the content provider 402 indicating that the individual 406 can access content of the electronic book 422 for an extended period of time or a decreased period of time depending on whether the request to modify the rental term of the electronic book 422 was a request to increase or decrease the rental term.

Further, when the rental term of the electronic book 422 expires, the electronic book rental module 428 may prevent access to the electronic book 422. In some cases, the electronic book rental module 428 may modify metadata of the electronic book 422 to indicate that subsequent access to the electronic book 422 is prohibited. In other situations, the electronic book rental module 428 may access metadata of the electronic book 422 received from the content provider 402 indicating that the rental term of the electronic book 422 has expired and deny requests to access content of the electronic book 422 after expiration of the rental term. Additionally, the electronic book rental module 428 may remove portions of the content of the electronic book 422 after the rental term expires. To illustrate, the electronic book rental module 428 may delete portions of the content of the electronic book 422 from the client device data store 418. The electronic book rental module 428 may also send portions of the content of the electronic book 422 back to the content provider 402.

The memory 412 also stores an electronic book rendering module 430 that is executable by the processor 410 to consume portions of electronic books via the client device 404. For example, the electronic book rendering module 430 may obtain a portion of the electronic book 422 and render content of the portion of the electronic book 422 via one or more output devices, such as a display device, speakers, and so forth. In some cases, the electronic book rendering module 430 may obtain portions of the electronic book 422 to be rendered from local storage of the client device 404, such as the client device data store 418, a temporary memory storage device, and the like. In other cases, the electronic book rendering module 430 may obtain portions of the electronic book 422 to be rendered from the content provider 402. To illustrate, as the individual 406 reads the electronic book 422, the electronic book rendering module 430 may obtain content of the electronic book 422 locally or via the content provider 402 that corresponds to the portions of the electronic book 422 being read by the individual 406 and subsequently render the portions of the electronic book 422 being read by the individual 406.

In addition, the memory 412 stores a digital rights management module 432 that is executable by the processor 410 to determine whether the rental terms of electronic books rented from the content provider 402 have expired. In some situations, the digital rights management module 432 may receive an indication from the content provider 402 that a rental term of an electronic book, such as the electronic book 422, has expired. The digital rights management module 432 may also utilize metadata of the electronic book 422 stored in the client device data store 418 specifying when the rental term expires and utilize an indication of time, such as a current time or a past time, obtained via the client device 404 to determine when the rental term of the electronic book 422 will expire. For example, the digital rights management module 432 may access information about an internal clock of the client device 404 to determine an indicator of time. In another example, the digital rights management module 432 may determine an indicator of time that is independent of an internal clock of the client device 404 and store this indicator of time in a local memory storage device. The digital rights management module 432 may then compare the indicator of time with metadata of the electronic book 422 indicating expiration of the rental term of the electronic book 422 to determine whether the rental term has expired.

When the indicator of time meets or exceeds the rental term expiration time, the digital rights management module 432 may prevent access to at least a portion of the content of the electronic book 422. In some instances, the digital rights management module 432 may send an indication to the content provider 402 that the rental term of the electronic book 422 has expired. In other scenarios, the digital rights management module 432 may invoke the electronic book rental module 428 to prevent access to content of the electronic book 422.

Further, the memory 412 includes a search module 434 that is executable by the processor 412 to search content of electronic books rented from the content provider 402. For example, the search module 434 may receive a search request including one or more keywords and search content of the electronic book 422 for the one or more keywords. In some cases, the search module 434 may search at least a portion of the content of the electronic book 422 after expiration of the rental term of the electronic book 422. To illustrate, metadata of the electronic book 422 may indicate that the individual 406 has permission to search at least a portion of the content of the electronic book 422 after expiration of the rental term.

The memory 412 also stores an annotations module 436 that is executable by the processor 410 to access annotations made by the individual 406 that are associated with electronic books rented from the content provider 402. In certain circumstances, the annotations module 436 may provide access to at least a portion of the annotations associated with electronic books, such as the electronic book 422, after expiration of the respective rental terms. For example, metadata of the electronic book 422 may indicate that the individual 406 can access annotations of the electronic book 422 after the expiration of the rental term. In some cases, the annotations may be stored locally in the client device data store 418, while in other cases, the annotations may be stored remotely, such as at the content provider 402.

Example User Interfaces

Figure 5:
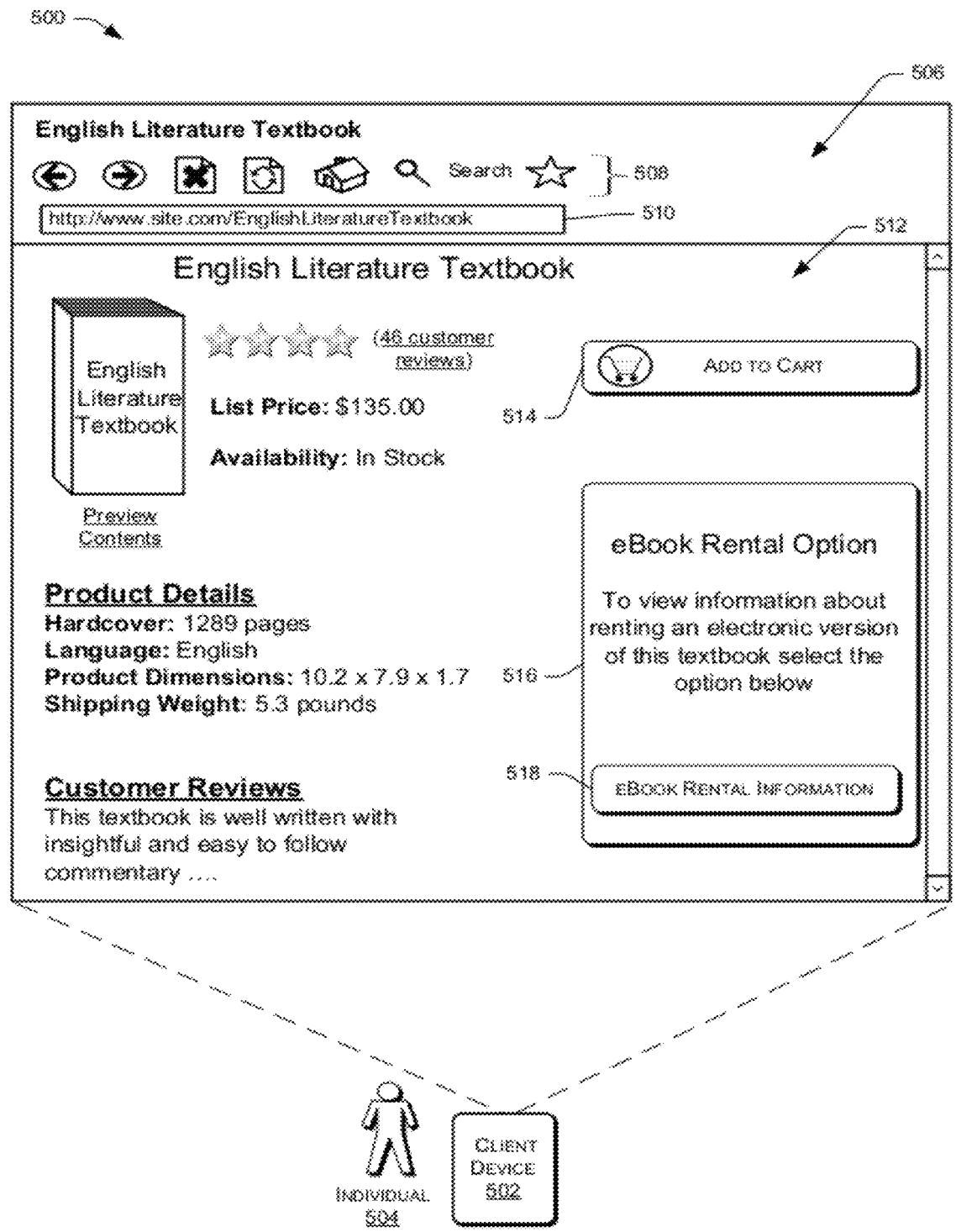
FIG. 5 shows a user interface including a detail page of a physical textbook with an option to obtain information about renting an electronic version of the textbook.

FIG. 5 shows a user interface 500 including a detail page of a physical textbook with an option to obtain information about renting an electronic version of the textbook. The user interface 500 may be provided to via a display of a client device 502 to an individual 504. In certain instances, the user interface 500 may be rendered via a content viewing application, such as a browser application, of the client device 502.

The user interface 500 includes a first portion 506. The first portion 506 includes a toolbar 508 with a number of icons that are selectable to perform operations with respect to content viewed via the user interface 500. The first portion 506 also includes a locator portion 510 that includes a locator indicating a page of a site being viewed via the user interface 500.

Additionally, the user interface 500 includes a second portion 512 that includes a page of a site providing options to acquire a book, English Literature Textbook. The second portion 512 includes information about the book English Literature Textbook, such as a list price, availability information, an image of English Literature Textbook, an option to preview content of the book, information related to reviews of English Literature Textbook, and other information associated with the book.

The second portion 512 also includes an option 514 that is selectable to indicate a request to purchase English Literature Textbook. Further, the second portion 512 includes a portion 516 including information about renting an electronic version of English Literature Textbook. The portion 516 also includes an option 518 that is selectable to obtain more information corresponding to renting an electronic version of English Literature Textbook.

Figure 6:
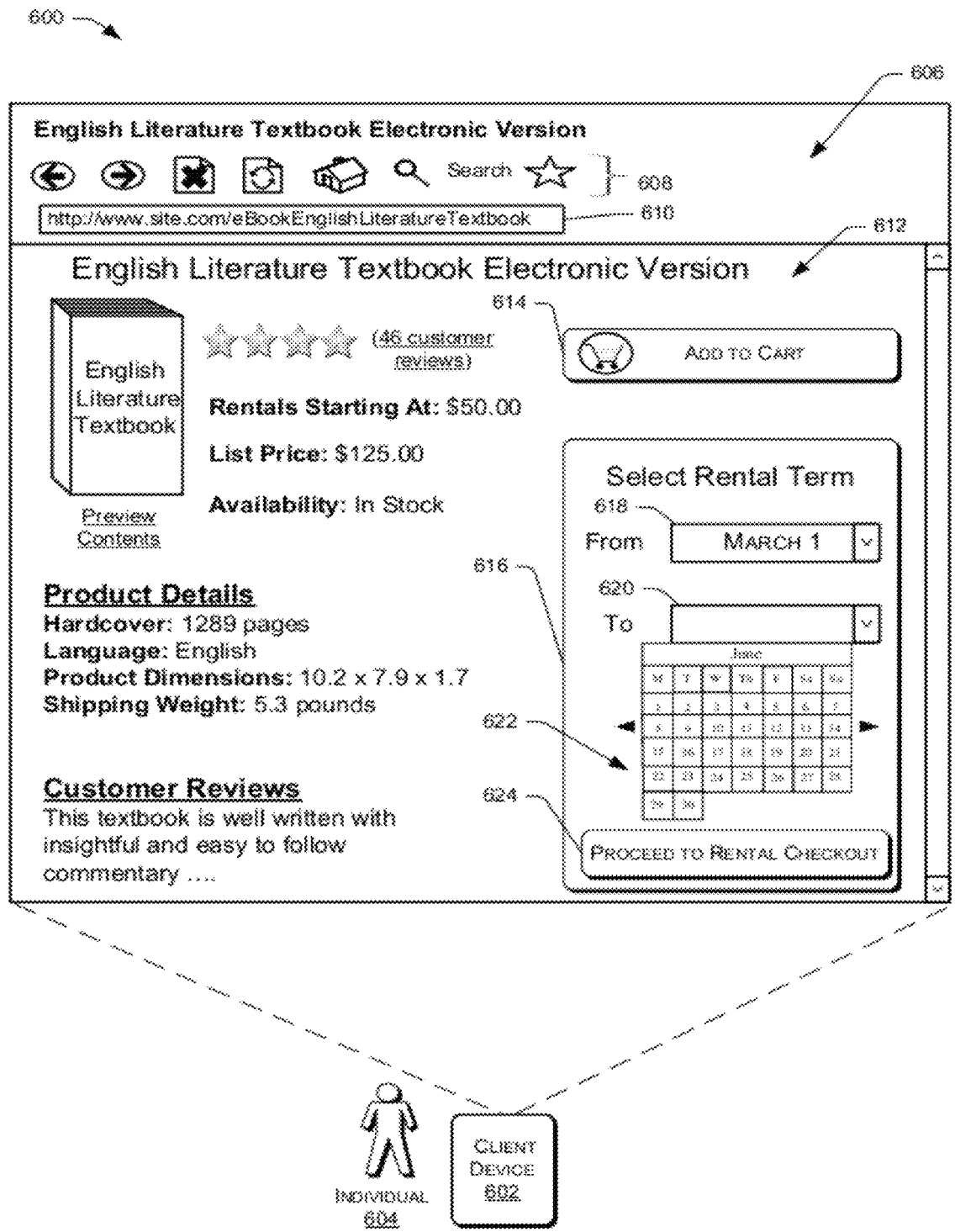
FIG. 6 shows a user interface including information about renting an electronic version of a textbook and an option selectable to rent the electronic version of the textbook.

FIG. 6 shows a user interface 600 including information about renting an electronic version of a textbook and an option selectable to rent the electronic version of the textbook. The user interface 600 may be provided via a display of a client device 602 to an individual 604. In some cases, the user interface 600 may be rendered by the client device 602 in response to selection of the option 518 of FIG. 5. The user interface 600 includes a first portion 606 having a toolbar 608 and a locator portion 610.

The user interface 600 also includes a second portion 612. The second portion 612 includes information about an electronic version of the book English Literature Textbook, as well as, an option 614 to indicate a request to purchase the electronic version of English Literature Textbook. Further, the second portion 612 includes a section 616 related to renting the electronic version of English Literature Textbook. The section 616 includes an element 618 and an element 620 that may capture a rental term for the electronic version of English Literature Textbook. For example, the element 618 may capture a beginning date of the rental term and the element 620 may capture an end date of the rental term. The beginning and/or end dates for the rental term may be selectable from a drop-down menu 622. In other implementations, one or more of the elements 618, 620 may be a text entry box where the individual 604 can enter a particular rental term, such as 125 days.

The drop-down menu 622 may include a calendar widget that can be utilized to select a rental term for English Literature Textbook. In certain instances, the calendar widget may indicate times when rental of English Literature Textbook is not available. To illustrate, a content provider may set a minimum or maximum rental term. In these cases, the calendar widget may prevent selection of days before the minimum rental term or after the maximum rental term. In particular situations, the maximum rental term may be related to a rental term associated with a payment amount that is equivalent to a purchase price of English Literature Textbook. In some implementations, the drop-down menu 622 may include predetermined options for a rental term of English Literature Textbook, such as 30 days, 90 days, quarter, semester, and so forth. The section 616 may also include an option 624 that is selectable to indicate a request to proceed to conduct a transaction to rent the electronic version of English Literature Textbook. In some cases, the option 624 is not selectable until a rental term has been entered via the elements 618, 620.

Figure 7:
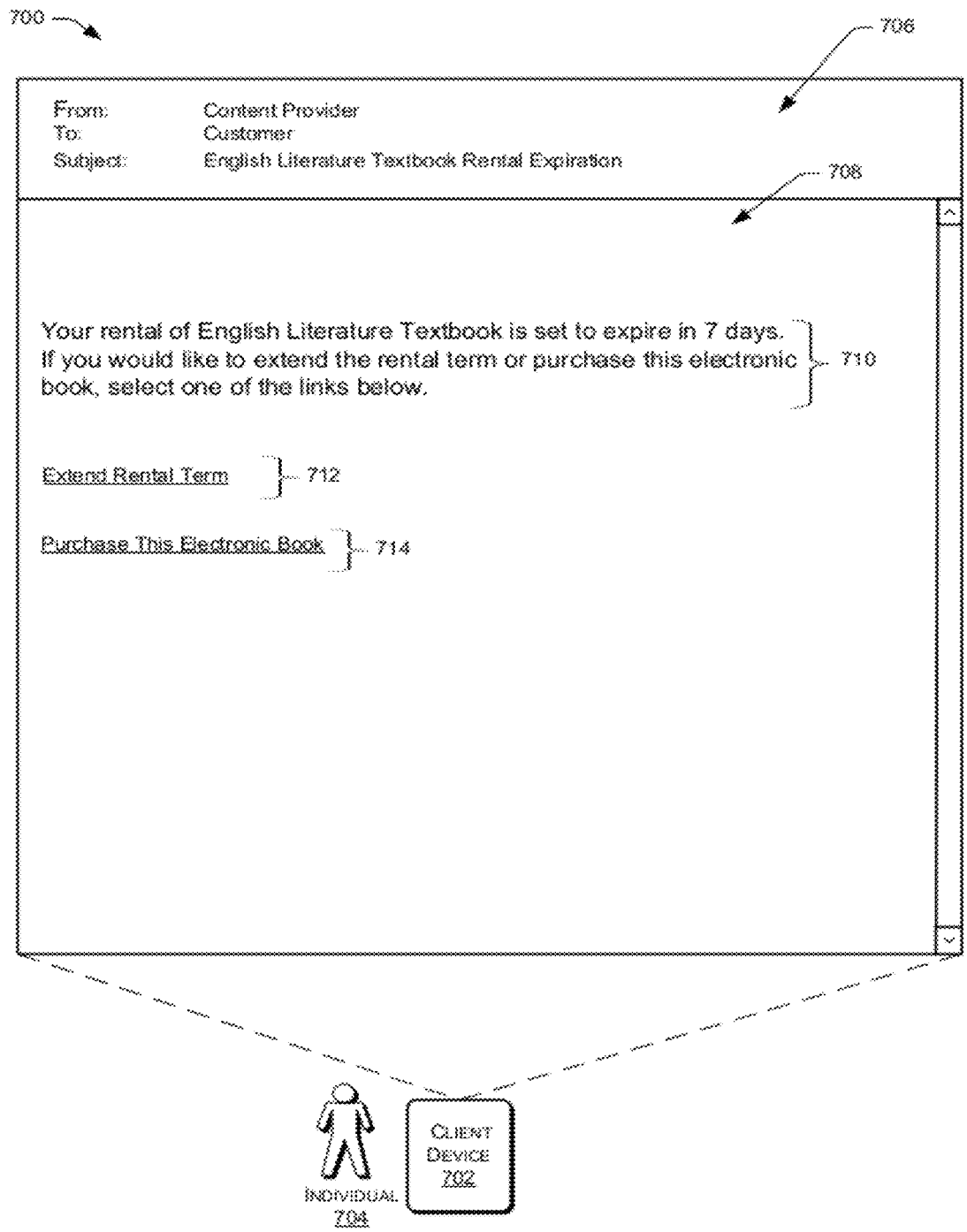
FIG. 7 shows a user interface including a communication reminding a customer that the rental period for a particular electronic book is going to expire.

FIG. 7 shows a user interface 700 including a communication reminding a customer that the rental period for a particular electronic book is going to expire. The user interface 700 may be provided via a display of a client device 702 to an individual 704. In the illustrative implementation shown in FIG. 7, the user interface 700 may include a communication (e.g. email, text message, etc.) sent from a content provider to an individual renting an electronic book from the content provider. In other implementations, the user interface 700 may include a page of a site of a content provider renting electronic books. For example, the information included in the user interface 700 may be accessible via a page including information about an account of the individual 704 with the content provider.

The user interface 700 includes a first portion 706 that indicates a sender of the communication, a recipient of the communication, and the subject of the communication. The user interface 700 also includes a second portion 708 that includes the body of the communication. The second portion 708 includes a section 710 indicating that a rental term of the electronic book English Literature Textbook will expire in 7 days. The second portion 708 also includes an option 712 that is selectable to extend the rental term and an option 714 that is selectable to convert the rental of the electronic version of English Literature Textbook to a purchase of the electronic version of English Literature Textbook.

Example Processes

Figure 8:
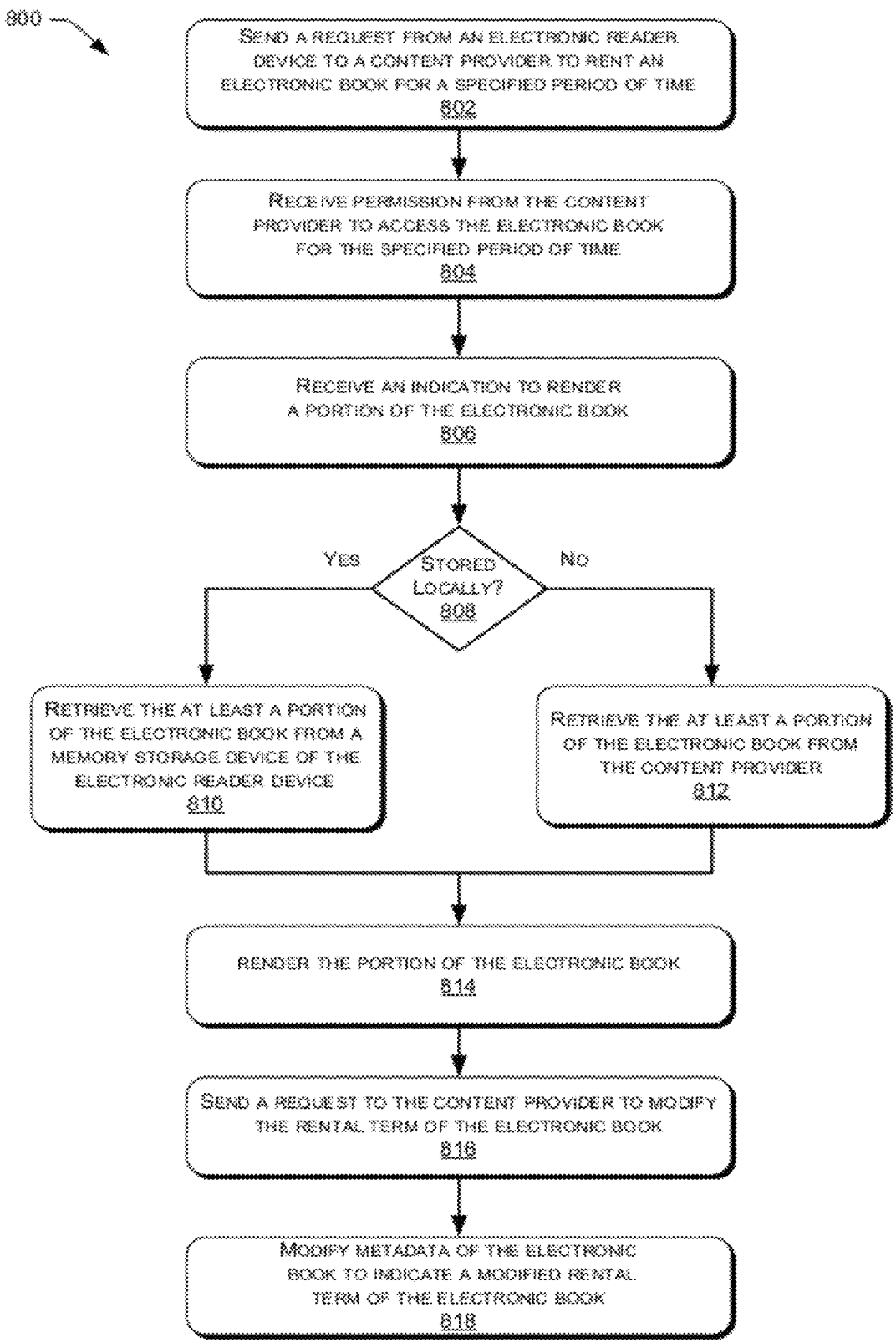
FIG. 8 is a flow diagram of a process for an electronic reader device to rent an electronic book.
Figure 9:
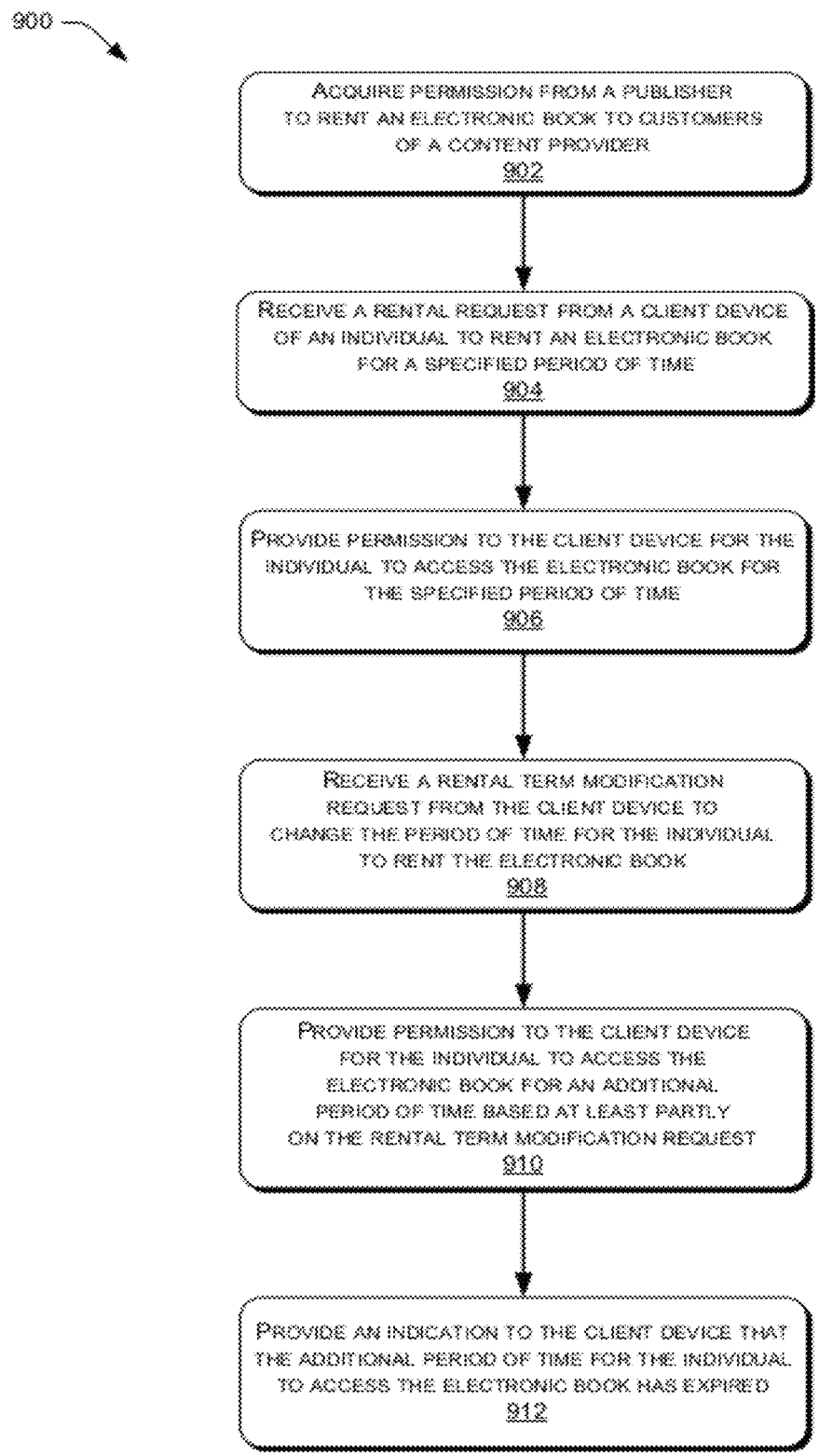
FIG. 9 is a flow diagram of a process to rent an electronic book for a specified duration and to change the rental term of the electronic book.
Figure 10:
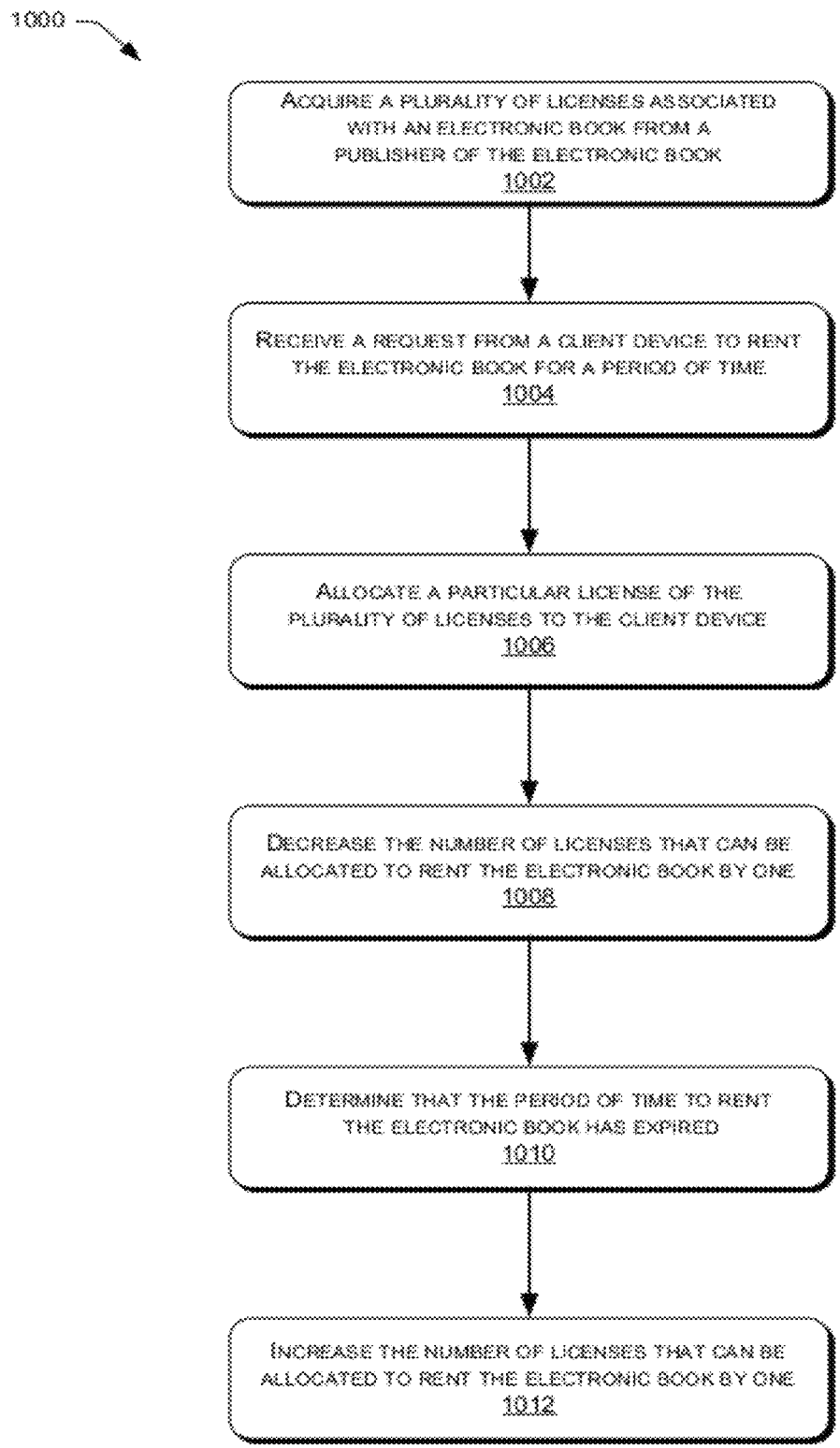
FIG. 10 is a flow diagram of a process to rent electronic books utilizing a portfolio of time-bound licenses.

FIGS. 8-10 show processes 800-1000 respectively, to rent electronic books. The processes 800-1000 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 8-10 may be performed by one or more of the components shown in FIGS. 1-7, such as the client devices 106, 216, 228, 308, 404, 502, 602, 702, the content provider server 304, other computing devices, or a combination thereof.

FIG. 8 is a flow diagram of a process 800 for an electronic reader device to rent an electronic book. At, 802, the electronic reader device sends a request to a content provider to rent an electronic book for a specified period of time, such as 30 days, 90 days, etc. At 804, the electronic reader device receives permission from the content provider to access the electronic book for the specified period of time. In particular, the electronic reader device may receive metadata, such as one or more vouchers, one or more keys, one or more certificates, one or more tokens, and the like, from the content provider that can be utilized to access the electronic book.

At 806, the electronic reader device receives an indication to render at least a portion of the electronic book. For example, a user of the client device may be reading a particular portion of the electronic book and the electronic reader device may receive an indication that the user is changing pages of the electronic book or navigating to a different portion of the electronic book. To illustrate, when the user of the electronic reader device activates an input device of the electronic reader device to navigate to a particular portion of the electronic book, a corresponding indication may be generated to cause the electronic reader device to render the particular portion of the electronic book.

At 808, the electronic reader device determines whether content of the electronic book corresponding to the portion to be rendered is stored locally at the electronic reader device. When the content to be rendered is stored locally, the process 800 moves to 810. At 810, the electronic reader device retrieves the portion of the electronic book to be rendered from local memory of the electronic reader device, such as a data store, cache memory, or other local memory storage device of the electronic reader device.

When content of the electronic book to be rendered is not stored locally at the electronic reader device, the process moves to 812. At 812, the electronic reader device retrieves the content to be rendered from the content provider. For example, the electronic reader device may send a request to the content provider to obtain content of the electronic book corresponding to the particular portion of the electronic book to be rendered. From both 810 and 812, the process moves to 814 where the electronic reader device renders particular content of the electronic book.

At 816, the electronic reader device sends a request to the content provider to modify the rental term of the electronic book. For example, the electronic reader device may send a request to extend the rental term of the electronic book or a request to reduce the rental term of the electronic book. At 818, the electronic reader device modifies metadata of the electronic book to reflect the modified rental term of the electronic book. In a particular implementation, the electronic reader device may modify the metadata of the electronic book to allow access to the content of the electronic book by the electronic reader device for the modified rental term.

FIG. 9 is a flow diagram of a process 900 to rent an electronic book for a specified duration and to change the rental term of the electronic book. At 902, a content provider acquires permission from a publisher of an electronic book to rent the electronic book to customers of the content provider. In some cases, the content provider may acquire permission from the publisher to rent the electronic book by agreeing to provide payments to the publisher according to a transaction formula in order to rent the electronic book. In other cases, the content provider may acquire permission from the publisher to rent the electronic book by acquiring one or more licenses to access content of the electronic book. The one or more licenses may be associated with a fixed or variable period of time that corresponds to a rental term of the electronic book. Additionally, the one or more licenses may be associated with a respective number of allocations, such that each license may be allocated to rent the electronic book a specified number of times for the period of time associated with the respective license.

At 904, the content provider receives a rental request from a client device of an individual to rent an electronic book for a specified period of time. To illustrate, the individual may operate the client device to send the rental request via one or more pages of a site associated with the content provider. In some instances, the rental request may be received in association with a request to rent a physical version of the book. In this way, the individual can rent both the electronic book and a physical version of the book. In some scenarios, the rental term for the electronic book and the physical version of the book may be different. For example, rental of the electronic book may be offered on a trial basis in conjunction with a corresponding rental and/or purchase of a physical version of the book.

At 906, the content provider provides permission to the client device for the individual to access the electronic book for the specified period of time. In certain circumstances, the content provider may provide permission to the client device to access the electronic book by sending metadata of the electronic book, such as one or more vouchers, one or more tokens, one or more keys, one or more certificates, and the like, to the client device. The content provider and the client device may also engage in one or more authentication processes in order to provide the individual with access to the electronic book.

At 908, the content provider receives a rental term modification request from the client device to change the period of time for the individual to rent the electronic book. In some cases, the rental term modification request may correspond to a request to extend the period of time to rent the electronic book. In other cases, the rental term modification request may correspond to a request to decrease the period of time to rent the electronic book. The rental term modification request may also correspond to a request to convert the rental of the electronic book to a purchase of the electronic book. In certain instances, the rental term modification request may be received from the client device after sending a notification, such as an email, text message, etc., to the client device that the rental term for the electronic book is going to expire. The notification may include one or more options selectable to modify the period of time to rent the electronic book. In a particular implementation, the rental term modification request may be received by the content provider in response to selection of the one or more options included in the notification by the individual. In other implementations, the rental term modification request may be received by the content provider in response to selection of one or more options included on a page of a site of the content provider.

At 910, the content provider provides permission to the client device for the individual to access the electronic book for an additional period of time, based at least partly, on the rental term modification request. In an illustrative implementation, the content provider may send modified metadata, such as modified vouchers, tokens, keys, certificates, etc., to the client device to provide the individual with access to the electronic book for the additional period of time.

At 912, the content provider provides an indication to the client device that the additional period of time for the individual to access the electronic book has expired. For example, the content provider may send a notification to the individual via the client device that the additional period of time to access the electronic book has expired. In another example, the content provider may provide the indication via a page of a site of the content provider, such as a page including information about an account of the individual with the content provider. In some situations, the content provider may cause at least a portion of the electronic book to be removed from memory of the client device in response to providing the indication that the additional period of time for the individual to access the electronic book has expired. The content provider may also deny access to content of the electronic book by the client device in response to receiving a content access request related to the electronic book after providing the indication that the additional period of time to access the electronic book has expired.

FIG. 10 is a flow diagram of a process 1000 to rent electronic books utilizing a portfolio of time-bound licenses. At 1002, a content provider acquires a plurality of licenses associated with an electronic book from a publisher of the electronic book. In certain implementations, one or more of the licenses may be associated with a fixed rental term, and in other implementations, one or more of the licenses may be associated with a variable rental term. Additionally, in some cases, one or more of the licenses may be allocated to one or more individuals up to a predetermined maximum number of times in order to provide the one or more individuals with access to content of the electronic book for the particular rental term associated with the one or more licenses.

At 1004, the content provider receives a request from a client device to rent the electronic book for a period of time. At 1006, the content provider allocates a particular license of the plurality of licenses to the client device. The particular license may be associated with a period of time that is the same as the period of time associated with the request. That is, the particular license may be associated with a rental term that corresponds to the requested period of time to rent the electronic book.

At 1008, the content provider decreases the number of licenses that can be allocated to rent the electronic book by one. Thus, fewer rentals of the electronic book can be offered by the content provider. At 1010, the content provider determines that the period of time to rent the electronic book has expired. For example, the content provider may compare an indicator of time with an expiration time for the rental term of the electronic book to determine that the rental term has expired. In another example, the content provider may receive an indication from the client device that the rental term has expired. At 1012, the content provider increases the number of licenses that can be allocated to rent the electronic book by one. Consequently, the content provider can now offer more rentals of the electronic book. However, although not shown in FIG. 10, if a maximum number of allocations for a particular license have occurred, then the number of licenses available to be allocated in order to rent the electronic book does not increase upon expiration of the particular license.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computing systems of a content provider, the one or more computing systems configured with specific executable instructions,
   acquiring, from a publisher of an electronic book, permission to rent the electronic book to individuals, wherein the acquiring comprises acquiring a plurality of licenses to access content of the electronic book and agreeing to provide a first payment to the publisher for an initial rental of the electronic book and a second, lesser amount to the publisher for a subsequent rental of the electronic book;
   receiving a rental request from a client device of an individual to rent an electronic book, the rental request specifying a period of time for the individual to rent the electronic book;
   providing, by the one or more computer systems, a single license from the plurality of licenses to the client device for the individual to access the electronic book for the period of time specified by the rental request, wherein providing the single license decreases the plurality of licenses available to the content provider by one;
   when the period of time for the individual to rent the electronic book ends, receiving the single license from the client device, wherein the individual is no longer able to access the electronic book when the single license is not present on the client device; and
   responsive to receiving the single license from the client device, increasing the plurality of licenses available to the content provider by one.

2. The computer-implemented method of claim 1, further comprising sending a notification to the client device that the period of time specified in the rental request will expire within a particular period of time, the notification including at least one option selectable to modify the period of time for the individual to rent the electronic book.

3. The computer-implemented method of claim 2, wherein a rental term modification request is received, at least partly, in response to selection of the at least one option.

4. The computer-implemented method of claim 3, wherein the rental term modification request indicates a request to extend the period of time for the individual to rent the electronic book.

5. The computer-implemented method of claim 3, wherein the rental term modification request indicates a request to purchase the electronic book.

6. The computer-implemented method of claim 1, further comprising causing at least a portion of the electronic book to be removed from memory of the client device after the period of time for the individual to rent the electronic book has expired.

7. The computer-implemented method of claim 1, further comprising:
receiving a content access request from the client device to access content of the electronic book after expiration of the period of time; and
denying the client device access to the electronic book at least in partly in response to receiving the content access request.

8. The computer-implemented method of claim 1, further comprising:
receiving a request from the client device to purchase an additional electronic book; and
receiving a request from the client device to convert the purchase of the additional electronic book to a rental of the additional electronic book for a certain period of time.

9. The computer-implemented method of claim 1, wherein the single license may be allocated to rent the electronic book for a respective period of time that is different from the period of time specified by the rental request received from the client device.

10. The computer-implemented method of claim 1, further comprising:
receiving a rental term modification request from the client device to change the period of time for the individual to rent the electronic book; and
providing permission to the client device for the individual to access the electronic book for an additional period of time based, at least partly, on the rental term modification request.

11. The computer-implemented method of claim 1, further comprising:
receiving a rental term modification request from the client device to increase the period of time for the individual to rent the electronic book beyond a maximum period of time for the individual to rent the electronic book; and
sending a notification to the client device offering to: (i) extend the rental term to the maximum period of time, the maximum period of time being a rental term for which a payment amount for the rental is equivalent to a purchase price of the electronic book, or (ii) convert the rental to a purchase.

12. The computer-implemented method of claim 1, further comprising causing a royalty payment to be provided to the publisher at least partly in response to allocating the single license to an additional client device.

13. The computer-implemented method of claim 1, wherein an amount of payment to the publisher for subsequent rentals of the electronic book decreases until a minimum payment amount is reached.

14. An electronic reader device comprising:
a processor; and
memory accessible by the processor, the memory storing:
an electronic book rental module that is executable by the processor to:
send a request to a content provider to rent an electronic book for a period of time;
receive metadata to access the electronic book for the period of time;
receive at least a portion of the electronic book;
send a request to the content provider to modify the period of time to access the electronic book; and
modify the metadata of the electronic book when the period of time to access the electronic book is modified;
an electronic book rendering module executable by the processor to render the at least a portion of the electronic book after receiving the metadata to access the electronic book; and
a search module executable by the processor to search the at least a portion of the content of the electronic book, wherein the metadata indicates that the search module has permission to search the electronic book and the metadata prohibits rendering of the electronic book on the electronic reader device.

15. The electronic reader device of claim 14, wherein the electronic book rendering module is executable by the processor to retrieve the at least a portion of the electronic book from a local memory storage device of the electronic reader device.

16. The electronic reader device of claim 14, wherein the electronic book rendering module is executable by the processor to retrieve the at least a portion of the electronic book by sending a request to the content provider for the at least a portion of the electronic book.

17. The electronic reader device of claim 14, wherein the memory further stores a digital rights management module executable by the processor to compare an indicator of time stored by a local memory storage device of the electronic reader device with particular metadata of the electronic book indicating when the period of time to rent the electronic book expires.

18. The electronic reader device of claim 14, wherein the metadata of the electronic book includes one or more vouchers, one or more keys, one or more certificates, one or more tokens, or combinations thereof.

19. The electronic reader device of claim 14, wherein the electronic book rendering module is executable by the processor to deny requests by a user of the electronic reader device to render content of the electronic book after expiration of the period of time to access the electronic book.

20. The electronic reader device of claim 14, wherein the electronic book rendering module is executable by the processor to remove at least a portion of the electronic book from a local memory storage device of the electronic reader device after expiration of the period of time to access the electronic book.

21. The electronic reader device of claim 14, wherein the memory further stores a digital rights management module executable by the processor to compare an indicator of time that is independent of an internal clock of the electronic reader device with particular metadata of the electronic book indicating when the period of time to rent the electronic book expires.

22. The electronic reader device of claim 14, wherein the memory further stores an annotations module executable by the processor to access annotations made by the individual that are associated with the electronic book rented from the content provider.

23. The electronic reader device of claim 22, wherein the annotations are accessible after the period of time to rent the electronic book expires.

24. The electronic reader device of claim 14, wherein the electronic book rendering module is further executable by the processor to determine if a portion of the electronic book that is to be rendered is stored locally on the electronic reader device and, if not, retrieve the portion of the electronic book that is to be rendered.

25. Computer readable storage memory having instructions stored thereon that, when executed by one or more processors, cause the one or more processors to perform acts comprising:

acquiring, from a publisher of a digital content item, permission to rent the digital content item to individuals, acquiring a plurality of licenses to access content of the digital content item, and agreeing to provide a first payment to the publisher for an initial rental of the digital content item and a second, lesser amount to the publisher for a subsequent rental of the digital content item;

receiving a rental request from a client device of an individual to rent the digital content item, the rental request specifying a period of time for the individual to rent the digital content item;

providing, by the one or more computer systems, a single license from the plurality of licenses to the client device for the individual to access the digital content item for the period of time specified by the rental request, wherein providing the single license decreases the plurality of licenses available to the content provider by one;

receiving the single license from the client device after the period of time for the individual to rent the digital content item ends, wherein the individual is no longer able to access the digital content item when the single license is not present on the client device; and increasing the plurality of licenses available to the content provider by one.

26. The computer readable storage memory of claim 25, wherein the instructions cause the one or more processors to perform further acts comprising:

sending a notification to the client device that the period of time specified in the rental request will expire within a particular period of time, the notification including at least one option selectable to modify the period of time for the individual to rent the digital content item.

27. The computer readable storage memory of claim 25, wherein the instructions cause the one or more processors to perform further acts comprising:

receiving a request from the client device to purchase an additional digital content item; and receiving a request from the client device to convert the purchase of the additional digital content item to a rental of the additional digital content item for a certain period of time.

28. The computer readable storage memory of claim 25, wherein the instructions cause the one or more processors to perform further acts comprising:

receiving a rental term modification request from the client device to change the period of time for the individual to rent the digital content item; and providing permission to the client device for the individual to access the digital content item for an additional period of time based, at least partly, on the rental term modification request.

29. The computer readable storage memory of claim 25, wherein the instructions cause the one or more processors to perform further acts comprising:

receiving a rental term modification request from the client device to increase the period of time for the individual to rent the digital content item beyond a maximum period of time for the individual to rent the digital content item; and sending a notification to the client device offering to at least one of: (i) extend the rental term to the maximum period of time, the maximum period of time being a rental term for which a payment amount for the rental is equivalent to a purchase price of the digital content item, or (ii) convert the rental to a purchase.

* * * * *